(12) United States Patent
Matsuo et al.

(10) Patent No.: US 9,576,605 B2
(45) Date of Patent: Feb. 21, 2017

(54) MAGNETIC DISK APPARATUS AND METHOD FOR ACCESSING DATA SECTOR

(71) Applicant: KABUSHIKI KAISHA TOSHIBA, Tokyo (JP)

(72) Inventors: Takashi Matsuo, Fujisawa Kanagawa (JP); Kenji Yoshida, Kamakura Kanagawa (JP); Kazuya Takada, Kamakura Kanagawa (JP); Yosuke Kondo, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/630,496

(22) Filed: Feb. 24, 2015

(65) Prior Publication Data

US 2016/0111126 A1    Apr. 21, 2016

Related U.S. Application Data

(60) Provisional application No. 62/066,264, filed on Oct. 20, 2014.

(51) Int. Cl.
*G11B 20/12* (2006.01)
*G11B 20/10* (2006.01)
*G11B 27/10* (2006.01)

(52) U.S. Cl.
CPC ........... *G11B 20/1217* (2013.01); *G11B 20/10* (2013.01); *G11B 20/10527* (2013.01); *G11B 27/105* (2013.01); *G11B 2020/10916* (2013.01); *G11B 2020/1221* (2013.01); *G11B 2020/1224* (2013.01); *G11B 2020/1232* (2013.01); *G11B 2020/1238* (2013.01)

(58) Field of Classification Search
CPC ........... G11B 5/5521–5/5543; G11B 20/1217; G11B 2020/1218; G11B 2020/1221; G11B 2020/1224; G11B 2020/1232; G11B 2020/1238; G11B 2020/1291–2020/1295
USPC ............... 360/48–49, 55, 69, 72.1–72.2, 75, 78.04,360/78.14
See application file for complete search history.

(56) References Cited

U.S. PATENT DOCUMENTS

| | | | | |
|---|---|---|---|---|
| 6,560,055 | B1 * | 5/2003 | Nemazie | G11B 20/1252 360/53 |
| 6,574,699 | B1 * | 6/2003 | Dobbek | G06F 3/0601 707/999.202 |
| 7,339,873 | B2 * | 3/2008 | Nakagawa | G11B 20/18 369/30.1 |
| 7,589,926 | B2 * | 9/2009 | Richmond | G11B 5/5543 360/48 |
| 7,612,960 | B2 * | 11/2009 | Satoh | G06F 3/0619 360/48 |
| 7,788,555 | B2 * | 8/2010 | Flake | G11B 20/18 714/710 |

(Continued)

*Primary Examiner* — Wayne Young
*Assistant Examiner* — James L Habermehl
(74) *Attorney, Agent, or Firm* — Patterson & Sheridan, LLP

(57) ABSTRACT

A magnetic disk apparatus includes a disk and a controller. The disk includes a plurality of tracks including a first track and a second track that is different from the first track. A plurality of data sectors are located on the tracks. The data sectors include short data sectors and long data sectors, each including a plurality of short data sectors. If the controller accesses a long data sector located at an end of the first track, the controller first accesses a short data sector of the long data sector at the end of the first track, and then accesses a short data sector of the long data sector at the beginning of the second track.

15 Claims, 5 Drawing Sheets

(56) References Cited

U.S. PATENT DOCUMENTS 8,145,957 B2 * 3/2012 Flake ................... G11B 20/18
714/710

* cited by examiner

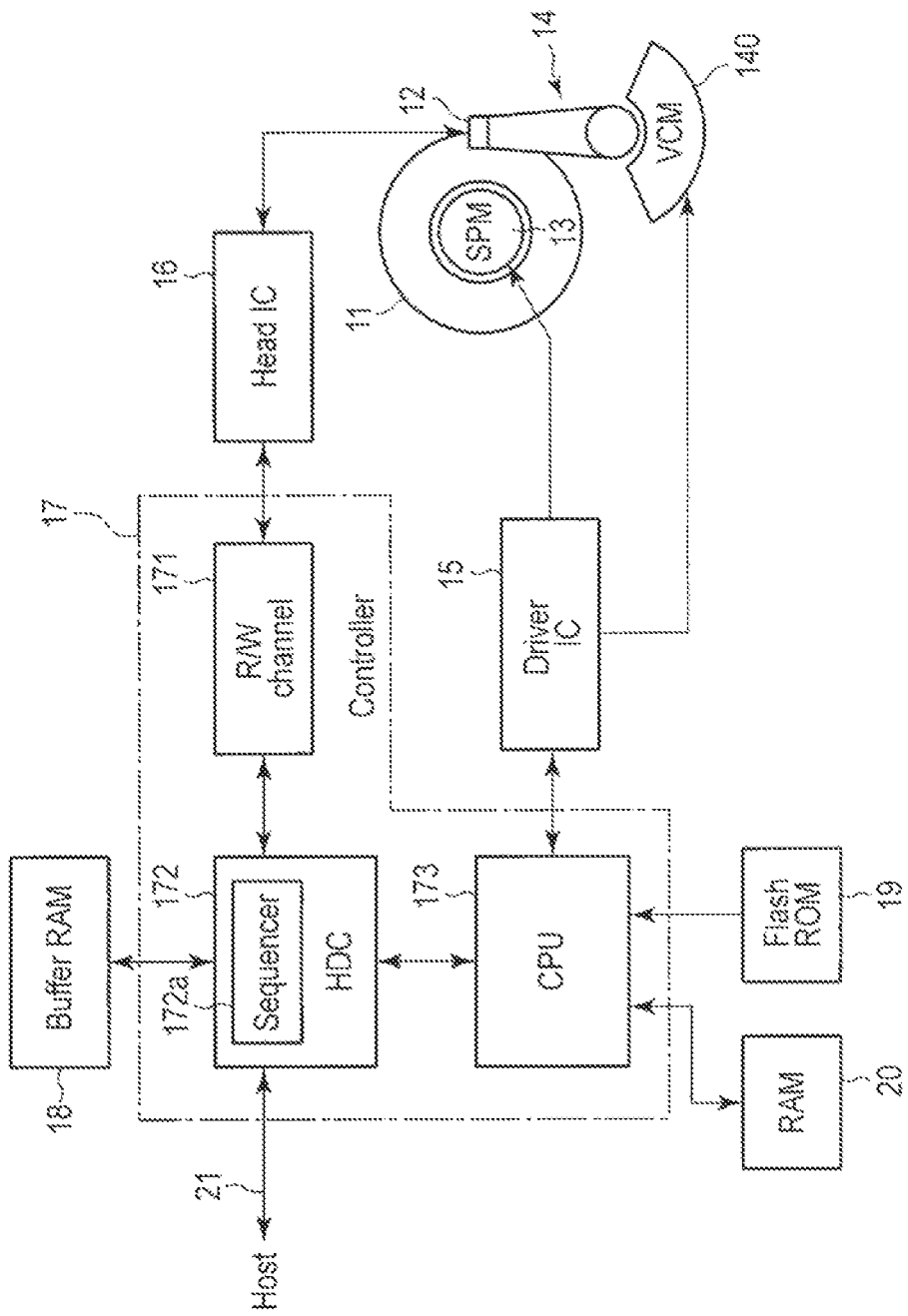
F I G. 1

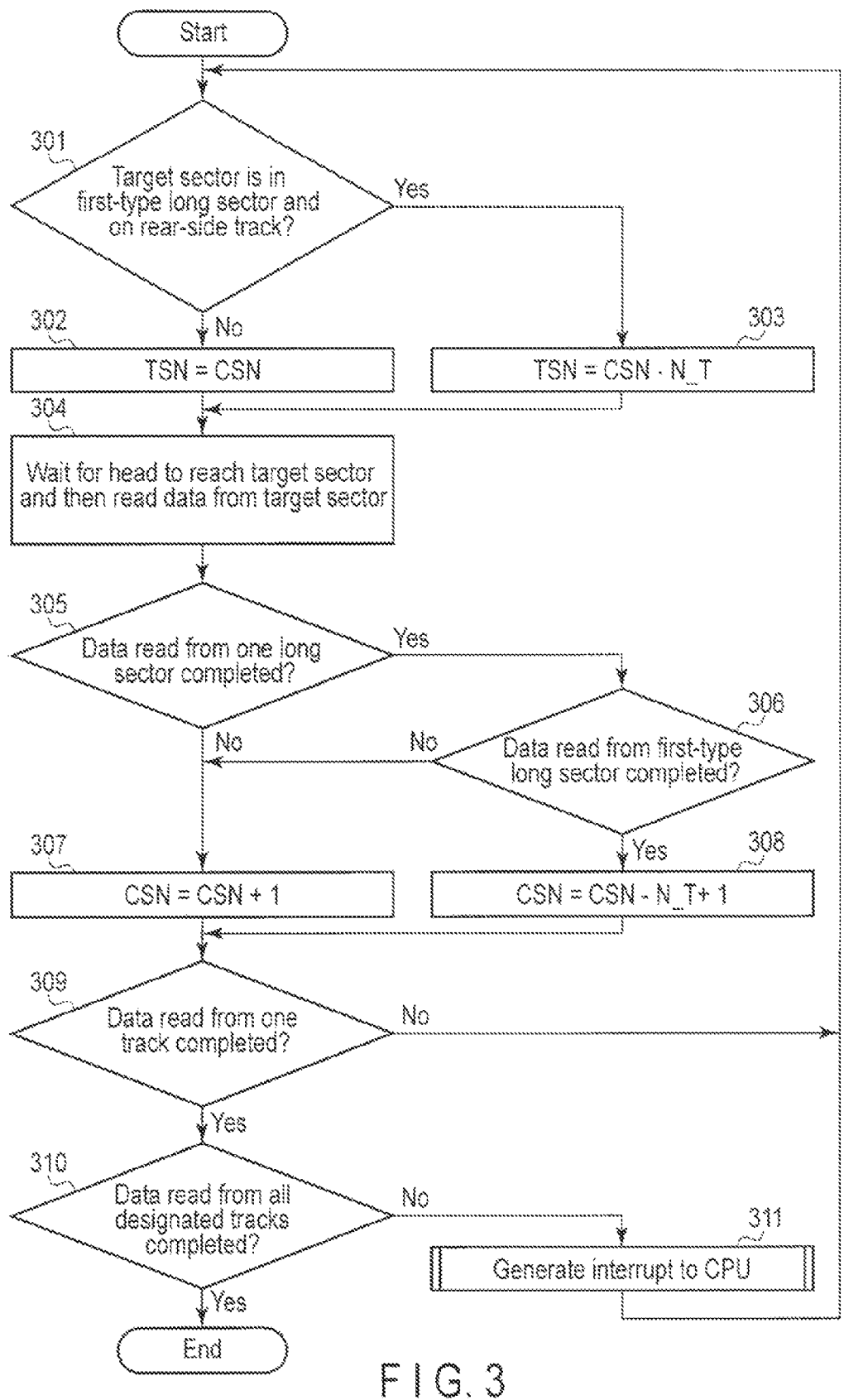
F I G. 3

MAGNETIC DISK APPARATUS AND METHOD FOR ACCESSING DATA SECTOR

CROSS-REFERENCE TO RELATED APPLICATION

This application is based upon and claims the benefit of priority from U.S. Provisional Patent Application No. 62/066,264, filed Oct. 20, 2014, the entire contents of which are incorporated herein by reference.

FIELD

Embodiments described herein relate generally to a magnetic disk apparatus and a method for accessing a data sector.

BACKGROUND

Recently, there has been a trend in which the size of a data sector, which is used to record data on magnetic disks, has increased. Such a data sector is called a long sector. The use of the long sector enhances, for example, the efficiency of formatting.

In general, in magnetic disk apparatuses, the data sector is located so as to fall within one track. Therefore, it is assumed that the data sector is located within one track even though the data sector (i.e., long sector) has a large size. When data sectors are located in such manner, it is possible that an area with no data sector (hereinafter referred to as "an extra area") will occur at, for example, an end portion of a track. It is also possible that the extra area will increase in accordance with an increase in data sector size. In this case, the storage capacity per track decreases.

BRIEF DESCRIPTION OF THE DRAWINGS

FIG. 1 is a block diagram depicting a configuration of a magnetic disk apparatus, according to an embodiment.

FIG. 3 is a flowchart of a method of processing a read access, as executed by the hard disk controller shown in FIG. 1.

DETAILED DESCRIPTION

Figure 2:
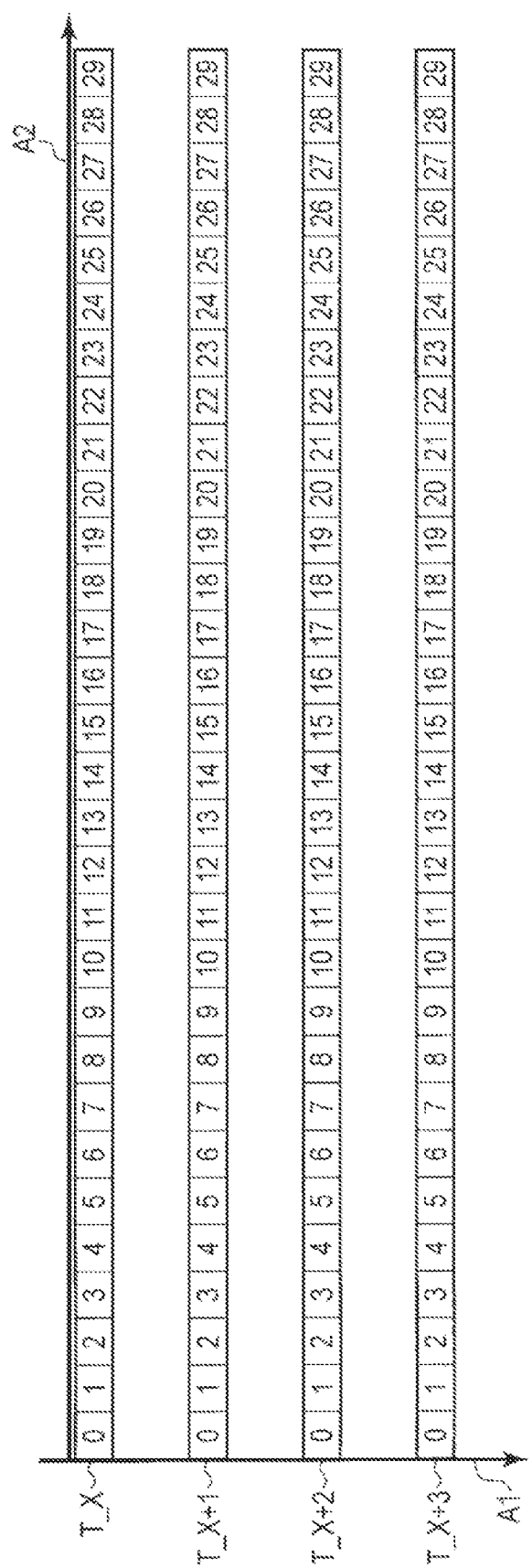
FIG. 2 depicts short sectors located on tracks of the disk depicted in FIG. 1, as well as sector numbers allocated to the short sectors.

Various embodiments will be described hereinafter with reference to the accompanying drawings.

In general, according to one embodiment, a magnetic disk apparatus comprises a disk and a controller. The disk comprises a plurality of tracks including a first track and a second track that is different from the first track, and a plurality of data sectors are located on the plurality of tracks. The plurality of data sectors include short data sectors and long data sectors, each including a plurality of short data sectors. If the controller accesses a long data sector located at an end of the first track, the controller first accesses a short data sector of the long data sector at the end of the first track, and then accesses a short data sector of the long data sector at the beginning of the second track.

FIG. 1 is a block diagram depicting a configuration of a magnetic disk apparatus, according to an embodiment. The magnetic disk apparatus is also referred to as a hard disk drive (HDD). The HDD shown in FIG. 1 comprises a disk (magnetic disk) 11, a head (magnetic head) 12, a spindle motor (SPM) 13, an actuator 14, a driver IC 15, a head IC 16, a controller 17, a buffer RAM 18, a flash ROM 19, and a RAM 20.

The disk 11 is a magnetic recording medium comprising, for example, on one surface, a recording surface on which data is magnetically recorded. The disk 11 is spun at a high speed by the SPM 13. The SPM 13 is driven by a driving current (or driving voltage) applied by the driver IC 15.

The disk 11 (or, more specifically, the recording surface of the disk 11) has, for example, a plurality of concentric tracks. In the embodiment shown, a plurality of data sectors (hereinafter referred to as long sectors) are located on the tracks. The long sectors each have a first size LS. Further, in the embodiment, a long sector that spans two sectors and is thus located on adjacent tracks is possible. This type of long sector will be referred to as a "first-type long sector." Normal long sectors that are each located on a single track will be referred to as "second-type long sectors."

Each long sector is divided (i.e., segmented) into portions of a second size SS, which is shorter than the first size LS. In the embodiment, the second size SS is a logical block size (such as 512 bytes) that is recognized by a host device (hereinafter, a host) that uses the HDD of FIG. 1. However, the second size SS is not limited to 512 bytes. Assuming that m is an integer greater than 1, the first size LS is m times the second size SS.

In the description below, divisions of the second size SS on each track will be referred to as short sectors. In this case, each track includes a plurality of short sectors. Sequential sector numbers are allocated to the short sectors on each track, beginning with, for example, the first short sector. Since the short sectors are obtained by dividing the long sectors, they can be regarded as internal sectors or sub-sectors of the long sectors. Therefore, the sector numbers of the short sectors may be referred to as internal sector numbers.

FIG. 2 shows examples of short sectors located on the tracks of disk 11, and examples of sector numbers allocated to the short sectors. More specifically, FIG. 2 shows four sequential tracks T_X, T_X+1, T_X+2, and T_X+3. For the sake of convenience of illustration, tracks T_X, T_X+1, T_X+2 and T_X+3 are depicted as being arranged, conceptually, in a linear fashion. Further, tracks other than tracks T_X, T_X+1, T_X+2 and T_X+3 are omitted.

In FIG. 2, arrow A1 is indicative of a radial direction of disk 11, i.e., a radial direction toward the center of disk 11. Arrow A1 is also indicative of a direction in which sequential access is performed when tracks T_X to T_X+3 are sequentially accessed. In FIG. 2, tracks T_X, T_X+1, T_X+ 2, and T_X+3 are accessed in the order shown. Further, in FIG. 2, arrow A2 is indicative of a circumferential direction of disk 11. Arrow A2 is also indicative of a direction in which access is performed within each of tracks T_X to T_X+3, i.e., a direction in which head 12 moves relative to the rotation of disk 11.

In FIG. 2, rectangular small divisions in each of tracks T_X to T_X+3 are indicative of short sectors. To facilitate illustration, each of tracks T_X to T_X+3 comprises 30 short sectors. In actuality, however, the number of short sectors located on each of tracks T_X to T_X+3 is much larger than 30. Sequential numerical values beginning with 0 are allocated as sector numbers to the sequential 30 short sectors (beginning with the first short sector) on track T_i (i=X, X+1, X+2, X+3). In the embodiment shown, m is equal to 8, and each long sector is divided into 8 short sectors. That is, each long sector comprises 8 short sectors.

Referring back to FIG. 1, head 12 is provided in association with the recording surface of disk 11. Head 12 is attached to the tip of actuator 14. When disk 11 is spun at high speed, head 12 floats above disk 11. Actuator 14 has a voice coil motor (VCM) 140 as a driving source for the actuator. VCM 140 is driven by a driving current (voltage) applied by driver IC 15. When actuator 14 is driven by VCM 140, this causes head 12 to move over disk 11 in the radial direction of disk 11 so as to draw an arc.

The HDD may incorporate a plurality of disks 11 unlike the structure shown in FIG. 1. Further, disk 11 shown in FIG. 1 may have recording surfaces on the opposite side thereof, and a head may be provided in association with this recording surface.

Driver IC 15 drives SPM 13 and VCM 140 under the control of controller 17 (more specifically, a CPU 173 in controller 17). Head IC 16 includes a head amplifier, which amplifies the signal (e.g., a read signal) read by head 12. Head IC 16 also includes a write driver, which converts the write data received from an R/W channel 171 in controller 17 into a write current, and sends the write current to head 12.

Controller 17 is, for example, a large-scale integrated circuit (LSI) (referred to as a system-on-a-chip (SOC)), where a plurality of elements are integrated on a single chip. Controller 17 includes read/write channel (R/W channel) 171, a hard disk controller (HDC) 172, and a CPU 173.

R/W channel 171 processes signals associated with read/write operations. R/W channel 171 also digitizes a read signal, and decodes read data from the digitized data. R/W channel 171 extracts, from the digitized data, servo data necessary for positioning head 12. R/W channel 171 also encodes write data.

HDC 172 is connected to a host via host interface 21. HDC 172 receives commands (such as a write command, a read command, etc.) from the host. HDC 172 controls data transfer between itself and the host. HDC 172 also controls data transfer between the host and buffer RAM 18, as well as between buffer RAM 18 and R/W channel 171.

HDC 172 includes a sequencer 172a. Sequencer 172a controls a known read gate in the R/W channel 171 so that a read operation, including transfer (or input) of read data, can be executed under the control of CPU 173. Sequencer 172a also controls a known write gate in R/W channel 171 so that a write operation, including transfer (or output) of write data, can be executed under the control of CPU 173.

CPU 173 functions as the main controller of the HDD shown in FIG. 1. CPU 173 controls at least part of the other elements of the HDD including HDC 172, in accordance with a control program. In the embodiment, the control program is stored in a particular area on disk 11, and at least part of the program is loaded into RAM 20 and used when the main power supply has been turned on. The control program may also be stored in flash ROM 19.

Buffer RAM 18 is formed of a volatile memory, such as a dynamic RAM (DRAM). Buffer RAM 18 is used to temporarily store data (i.e., write data) to be written to disk 11, as well as data read from disk 11.

Flash ROM 19 is a rewritable nonvolatile memory. In the embodiment shown, part of the storage area of flash ROM 19 pre-stores an initial program loader (IPL). CPU 173 executes the IPL when the main power supply has been turned on, thereby loading into RAM 20 at least part of the control program stored on disk 11.

Part of the storage area of RAM 20 is used to store at least part of the control program. The other part of the storage area of RAM 20 is used as a work area for CPU 173.

Figure 4:
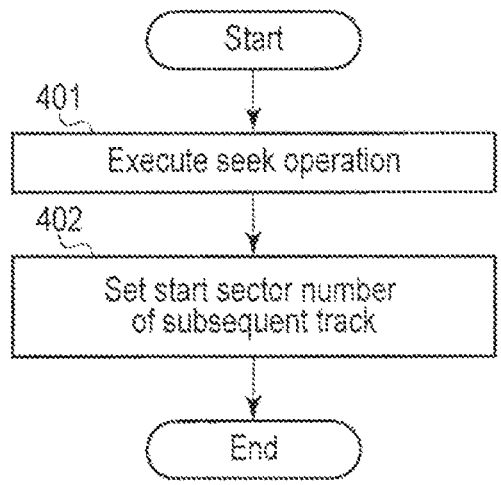
FIG. 4 is a flowchart of a method of processing a seek, as executed by the CPU shown in FIG. 1.
Figure 5:
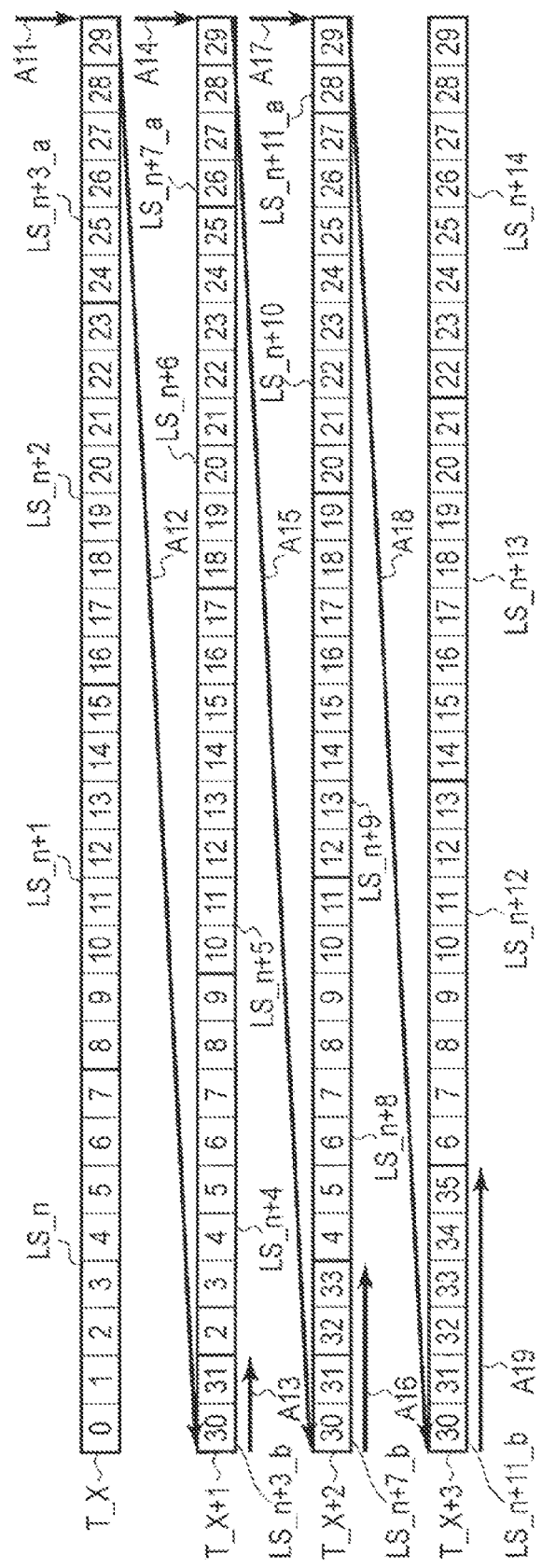
FIG. 5 is a conceptual diagram depicting an operation performed when a plurality of long sectors on a plurality of tracks are sequentially accessed.

Referring to FIGS. 3 to 5, access processing in the HDD of FIG. 1 is described, with read access processing being used as an example. FIG. 3 is a flowchart depicting a method of processing a read access, as performed by HDC 172 (more specifically, sequencer 172a of HDC 172), and FIG. 4 is a flowchart depicting a method of processing a seek, as performed by CPU 173. FIG. 5 is a conceptual diagram for depicting an operation performed when a plurality of long sectors on a plurality of tracks are sequentially accessed. In the embodiment, it is assumed that data is sequentially read from 15 long sectors LS_n to LS_n+14 on tracks T_X to T_X+3.

As shown in FIG. 5, long sectors LS_n to LS_n+2 and part LS_n+3_a of long sector LS_n+3 are located on track T_X. The remaining part LS_n+3_b of long sector LS_n+3, long sectors LS_n+4 to LS_n+6, and part LS_n+7_a of long sector LS_n+7 are located on track T_X+1. That is, long sector LS_n+3 is a first-type long sector provided on both tracks T_X and T_X+1 (more specifically, on the back end of track T_X and the front end of track T_X+1). In association with long sector LS_n+3, track T_X will be referred to as a front-side track and track T_X+1 will be referred to as a rear-side track.

The remaining part LS_n+7_b of long sector LS_n+7, long sectors LS_n+8 to LS_n+10, and part LS_n+11_a of long sector LS_n+11 are located on track T_X+2. The remaining part LS_n+11_b of long sector LS_n+11 and long sectors LS_n+12 to LS_n+14 are located on track T_X+3.

Assume that, in order to read data from long sectors LS_n to LS_n+14 on tracks T_X to T_X+3, CPU 173 drives actuator 14 via driver IC 15 to move head 12 to track T_X. In this case, CPU 173 sets, in a particular register in sequencer 172a of HDC 172, sector number 0 (i.e., start sector number 0) for the first short sector on track T_X. After that, CPU 173 activates sequencer 172a.

Upon activation, sequencer 172a sets the start sector number 0 set by CPU 173 as a current sector number CSN in a current sector number register in sequencer 172a, and then starts read access processing as shown in the flowchart of FIG. 3. In performing read access processing, sequencer 172a accesses a short sector as a target (hereinafter referred to as a target sector) in accordance with a target sector number TSN determined based on the current sector number CSN. The target sector number TSN is a sector number previously allocated to the short sector that is now the target sector. The current sector number CSN differs from the target sector number TSN in that, when the target sector is in a first-type long sector, the current sector number CSN is managed such that, in the first-type long sector, the current sector number CSN follows the sector number of a preceding short sector even after the position of the target sector is switched to the rear-side track.

Upon starting read access processing, sequencer 172a first determines, based on the current sector number CSN, whether the target sector is in a first-type long sector and is on the rear-side track (block 301). This determination is executed based on whether the current sector number CSN exceeds sector number 29 allocated to a last short sector on the track (in this example, track T_X). In this example, the target sector is in a second-type long sector (which corresponds to the "No" branch from block 301). At this time, sequencer 172a sets the current sector number CSN as a target sector number TSN in a target sector number register in sequencer 172a (block 302).

Subsequently, sequencer 172a waits for head 12 to reach a target sector indicated by the target sector number TSN, and then reads data, using head 12, from the target sector via head IC 16 and R/W channel 171 (block 304). That is, sequencer 172a asserts the read gate in R/W channel 171 during a period corresponding to the target sector.

After that, sequencer 172a determines whether a read of data from one long sector including the target sector (i.e., a target long sector) has been completed based on the current sector number CSN (block 305). That is, sequencer 172a determines whether the target sector is the last short sector of the long sector.

The above determination is executed based on whether the remainder "CSN mod m" is 7, where remainder "CSN mod m" is obtained by, for example, dividing the current sector number CSN by the number m (=8) of short sectors included in one long sector. In this example, a read of data from one long sector is not yet completed (No in block 305). At this time, sequencer 172a increments the current sector number CSN by one (block 307). Sequencer 172a may execute the above determination by counting the number of accessed short sectors in each target long sector (target data sector), and determining whether the number is equal to m.

Next, sequencer 172a determines whether a data read from one track including the target sector has been completed (block 309). That is, sequencer 172a determines whether the target sector read immediately before this determination (block 309) is the last short sector of the one track. In this example, the data read from the track is not completed (No in block 309). At this time, sequencer 172a returns to block 301.

In the event that data has been read from all short sectors (i.e., short sectors with sector numbers 0 to 7) included in the first long sector LS_n on track T_X (Yes in block 305), sequencer 172a determines whether the long sector whose data read has been completed is of the first type (block 306). In this example, the long sector whose data read has been completed is of the second type (No in block 306).

At this time, sequencer 172a increments the current sector number CSN by one (block 307), as in the case where a data read from one long sector has not been completed (No in block 305). In this example, the current sector number CSN is increased from 7 to 8. The short sector indicated by the current sector number CSN (=7) is not the last short sector of track T_X, and hence the data read from the track is not completed (No in block 309). Therefore, sequencer 172a returns to block 301.

Assume that sequencer 172a executed read of data from long sectors LS_n to LS_n+2 on track T_X, and then executed a data read from the short sector in part LS_n+3_a of long sector LS_n+3, which follows long sector LS_n+2 (block 304). At this time, the target sector number TSN is identical to the current sector number CSN, i.e., 29 (see FIG. 5).

After a data read from short sector LS_n+3_a is performed, sequencer 172a increments the current sector number CSN by one (block 307), since a data read from one long sector is not completed (No in block 305). As a result, the current sector number CSN is increased from 29 to 30.

Subsequently, sequencer 172a determines whether the data read from one track has been completed (block 309). In this example, the target sector whose data has been read immediately before this determination (block 309) is a short sector with sector number 29, i.e., the last short sector of track T_X.

At this time (Yes in block 309), sequencer 172a determines whether data reads from all tracks including all long sectors designated by CPU 173 have been completed (block 310). In this example, data reads from all designated tracks have not yet been completed (No in block 310). At this time, sequencer 172a generates an interrupt to CPU 173 (block 311).

That is, sequencer 172a interrupts the data read from long sector LS_n+3, if the intermediate short sector is the last short sector of track T_X. Then, sequencer 172a generates an interrupt to CPU 173 as indicated by arrow A11 in FIG. 5. CPU 173 waits for CPU 173 to complete interrupt processing (more specifically, seek processing) executed in response to the generated interrupt. After interrupt processing by CPU 173 is completed, sequencer 172a returns to block 301, where the data read from long sector LS_n+3 is resumed.

Upon accepting the interrupt from sequencer 172a, CPU 173 starts seek processing shown in the flowchart of FIG. 4 as interrupt processing responsive to the interrupt. First, CPU 173 controls driver IC 15 to execute a seek operation for moving head 12 from track T_X on which head 12 is currently positioned, to subsequent track T_X+1, as indicated by arrow A12 in FIG. 5 (block 401). After completing the seek operation, CPU 173 sets, in the particular register in sequencer 172a, start sector number 0, which indicates the first short sector on track T_X+1 (block 402).

At this time, sequencer 172a determines, based on the current sector number CSN, whether the target sector is in a long sector of the first type and on the rear-side track (block 301). In this example, the current sector number CSN is 30, which exceeds 29. Therefore, sequencer 172a determines that the target sector is in the long sector of the first type and on the rear-side track (=track T_X+1) (Yes in block 301).

Next, sequencer 172a determines a new target sector number TSN based on the current sector number CSN (=30) and the number N_T (=30) of short sectors in track T_X, and sets the determined target sector number TSN in the target sector number register (block 303). More specifically, sequencer 172a sets, as the target sector number TSN, a value (CSN–N_T) obtained by subtracting the number N_T (i.e., an offset) of short sectors in track T_X from the current sector number CSN. In this example, CSN–N_T=30–30=0, and hence the target sector number TSN is changed from 29 to 0. That is, the target sector number TSN is set back by the offset.

Next, sequencer 172a reads data from a target sector indicated by the target sector number TSN (=0) (block 304). At this time, the current sector number CSN is 30. In this case, since the data read from one long sector is not yet completed (No in block 305), sequencer 172a increments the target sector number TSN (=30) by one (block 307). As a result, the current sector number CSN is increased from 30 to 31.

As described above, in the embodiment, to enable short-sector by short-sector access to a long sector, the current sector number CSN is sequentially incremented one by one until the last short sector of the long sector is reached, even though the long sector is of the first type. In the case of, for example, long sector LS_n+3, even when the target sector is switched to a short sector on rear-side track T_X+1, the current sector number CSN is sequentially increased one by one within a range of LS_n+3_b indicated by arrow A13 in FIG. 5, following a range of LS_n+3_a on front-side track T_X.

Subsequently, the sequencer 172a returns to block 301 via block 309. At this time, the current sector number CSN is 31, and the target sector is in long sector LS_n+3 of the first type and on the rear-side track (Yes in block 301). In this case, the sequencer 172a sets CSN−N_T as the target sector number TSN (block 303). In this example, CSN−N_T=31−30=1, and hence the target sector number TSN is changed from 30 to 1.

Next, sequencer 172a reads data from a target sector indicated by the target sector number TSN (=1) (block 304). At this time, the current sector number CSN is 31, and a data read from first-type long sector LS_n+3 is already completed (Yes in blocks 305 and 306).

Sequencer 172a sets, as a new current sector number CSN (=31−30+1=2), the value obtained by subtracting N_T (offset) from the value obtained by incrementing the current sector number CSN (=30) by one (block 308). As a result, the current sector number CSN is changed from 31 to 2.

After that, sequencer 172a returns to block 301 via block 309. At this time, the current sector number CSN is 2, and the target sector is in second-type long sector LS_n+4 (No in block 301). Subsequent operations are similar to those performed when the above-described second-type long sectors LS_n to LS_n+2 and first-type long sector LS_n+3 are accessed.

That is, first, long sectors LS_n+4 to LS_n+6 and part LS_n+7_a of long sector LS_n+7 are sequentially accessed short sector by short sector. During the accessing period, the current sector number CSN is sequentially incremented one by one from 2 to 30 (block 307). Further, the target sector number TSN is set to a value equal to the current sector number CSN until just before the current sector number CSN is incremented from 29 to 30 (block 302).

Assume here that a short sector with sector number 29 on track T_X+1 has been accessed (block 304). This short sector is the last short sector on track T_X+1, but is not the last short sector of long sector LS_n+7 (No in block 305). Accordingly, the current sector number CSN is incremented from 29 to 30 (block 307).

In this case, sequencer 172a generates an interrupt to CPU 173 as indicated by arrow A14 in FIG. 5 (block 311). As a result, a seek operation is performed (block 401), thereby moving head 12 from track T_X+1 to track T_X+2 as indicated by arrow A15 in FIG. 5.

Thereafter, the remaining sector range of long sector LS_n+7, i.e., range LS_n+7_b on track T_X+2 indicated by arrow A16 in FIG. 5, is sequentially accessed short sector by short sector. Also during this accessing period, the current sector number CSN is sequentially incremented one by one, following range LS_n+7_a on front-side track T_X+1 (block 307). On the other hand, the target sector number TSN is set to a value obtained by subtracting the offset from the current sector number CSN (block 303).

When the last short sector of long sector LS_n+7 has been accessed, access to long sector LS_n+7 is complete (Yes in blocks 305 and 306). At this time, the target sector number TSN and the current sector number CSN are 3 (TSN=3) and 33 (CSN=33), respectively. In this case, the current sector number CSN is changed from 33 to 4 based on the offset (N_T=30) (CSN−N_T+1=33−30+1=4) (block 308).

After that, long sectors LS_n+8 to LS_n+10 and part LS_n+11_a of long sector LS_n+11 are sequentially accessed short sector by short sector. During the accessing period, the current sector number CSN is sequentially incremented one by one from 4 to 30 (block 307). Further, the target sector number TSN is set to a value equal to the current sector number CSN until just before the current sector number CSN is incremented from 29 to 30 (block 302).

Assume here that a short sector with sector number 29 on track T_X+2 has been accessed (block 304). This short sector is the last short sector on track T_X+2, but is not the last short sector of long sector LS_n+11 (No in block 305). Accordingly, the current sector number CSN is incremented from 29 to 30 (block 307).

In this case, sequencer 172a generates an interrupt to CPU 173 as indicated by arrow A17 in FIG. 5 (block 311). As a result, a seek operation is performed (block 401 in FIG. 4), thereby moving head 12 from track T_X+2 to track T_X+3 as indicated by arrow A18 in FIG. 5.

Thereafter, the remaining sector range of long sector LS_n+11, i.e., range LS_n+11_b on track T_X+3 indicated by arrow A19 in FIG. 5, is sequentially accessed short sector by short sector. Also during this accessing period, the current sector number CSN is sequentially incremented one by one, following range LS_n+11_a on front-side track T_X+2 (block 307). On the other hand, the target sector number TSN is set to a value obtained by subtracting the offset from the current sector number CSN (block 303).

When the last short sector of long sector LS_n+11 has been accessed, access to long sector LS_n+11 is completed (Yes in blocks 305 and 306). At this time, the target sector number TSN and the current sector number CSN are 5 (TSN=3) and 35 (CSN=35), respectively. In this case, the current sector number CSN is changed from 35 to 6 based on the offset (N_T=30) (CSN−N_T+1=35−30+1=6) (block 308). After that, long sectors LS_n+12 to LS_n+14, which follow long sector LS_n+11, are sequentially accessed short sector by short sector.

In general, a plurality of servo areas are discretely arranged on each track on disk 11. In FIG. 5, the servo areas are omitted. Each track may include a short sector to be split with a servo area interposed (hereinafter referred to as a split short sector). The split short sector corresponds to a conventionally known normal split sector. Therefore, if the split portions are managed using an index that is indicative thereof, the split short sector can be accessed.

The embodiment is directed to a case where access processing in the HDD shown in FIG. 1 pertains to read access processing. However, write access processing can also be executed in the same way. Also, in write access processing, the target sector number TSN and the current sector number CSN can be set and updated in the same way as in read access processing.

According to the above-described embodiment, even when a single data sector (i.e., long sector) is provided on a plurality of tracks, the data sector can be reliably accessed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk apparatus comprising:
a disk comprising a plurality of tracks including a first track and a second track that is different from the first track, each of the tracks including a plurality of short data sectors that is assigned first sector numbers that are consecutive within the track and not consecutive between adjacent tracks; and a controller configured to access data sectors of the disk using a head, wherein, when the controller accesses a long data sector including a plurality of short data sectors and located in the first track and the second track, the controller first accesses one or more short data sectors of the long data sector in the first track, and then accesses one or more short data sectors of the long data sector in the second track, based on second sector numbers that correspond to the plurality of short data sectors of the long data sector and are consecutive between the first and second tracks.

2. The magnetic disk apparatus of claim 1, wherein, when the controller accesses the long data sector, the controller interrupts in between accessing the last short data sector of the long data sector at an end of the first track, and accessing the first short data sector of the long data sector at a beginning of the second track.

3. The magnetic disk apparatus of claim 1, wherein the first and second data tracks are adjacent to each other.

4. The magnetic disk apparatus of claim 1, wherein
when the controller accesses short data sectors in the second track, the controller sequentially increments the second sector number each time a new short data sector is read, and
the first sector number, which the controller uses to access the new short data sector, is equal to the incremented second sector number or the incremented second sector number minus the number of short data sectors on the first track.

5. The magnetic disk apparatus of claim 4, wherein the first sector number that the controller uses to access the new short data sector is equal to (i) the incremented second sector number if the incremented second sector number is less than or equal to the number of short data sectors on the first track and (ii) the incremented second sector number minus the number of short data sectors on the first track if the incremented second sector number is greater than the number of short data sectors on the first track.

6. The magnetic disk apparatus of claim 1, wherein the controller comprises:
a CPU which controls access to the disk using the head and executes a seek operation on the head to move the head to a first track; and
a disk controller which accesses the disk under control of the CPU in units of a data sector, wherein the disk controller is configured to interrupt the CPU to execute a seek operation on the head to move the head to the second track.

7. A method, in a magnetic disk apparatus comprising a disk, for accessing the disk using a head, the disk comprising a plurality of tracks including a first track and a second track that is different from the first track, each of the tracks including a plurality of short data sectors that is assigned first sector numbers that are consecutive within the track and not consecutive between adjacent tracks, the method comprising:
accessing one or more short data sectors of a long data sector in the first track, the long data sector located in the first track and the second track; and
then accessing one or more short data sector of the long data sector of in the second track, wherein
the accessing of the short data sectors of the long data sector is carried out based on second sector numbers that correspond to the short data sectors of the long data sector and are consecutive between the first and second tracks.

8. The method of claim 7, further comprising:
interrupting in between accessing the last short data sector of the long data sector at an end of the first track and accessing the first short data sector of the long data sector at a beginning of the second track.

9. The method of claim 7, wherein the first and second data tracks are adjacent to each other.

10. The method of claim 7, wherein, when accessing short data sectors in the second track, the first sector number, which is used to access the next short data sector, is equal to the incremented second sector number or the incremented second sector number minus the number of short data sectors on the first track.

11. The method of claim 10, wherein the first sector number that is used to access the next short data sector is equal to (i) the incremented second sector number if the incremented second sector number is less than or equal to the number of short data sectors on the first track and (ii) the incremented second sector number minus the number of short data sectors on the first track if the incremented second sector number is greater than the number of short data sectors on the first track.

12. The method of claim 7, wherein the magnetic disk apparatus comprises:
a CPU which controls access to the disk using the head and executes a seek operation on the head to move the head to a first track; and
a disk controller which accesses the disk under control of the CPU in units of a data sector, wherein the disk controller is configured to interrupt the CPU to execute a seek operation on the head to move the head to the second track.

13. A magnetic disk apparatus comprising:
a disk comprising a plurality of tracks including a first track and a second track that is different from the first track, each of the tracks including a plurality of short data sectors that is assigned first sector numbers that are consecutive within the track and not consecutive between adjacent tracks;
a CPU which controls access to the disk using a head and executes a seek operation on the head to move the head; and
a disk controller which accesses the disk under control of the CPU in units of a data sector, wherein
while a long data sector including a plurality of short data sectors and located in the first track and the second track is being accessed, the disk controller first accesses one or more short data sectors of the long data sector in the first track and then one or more short data sectors of the long data sector in the second track, based on second sector numbers that correspond to the plurality of short data sectors of the long data sector and are consecutive between the first and second tracks, and generates an interrupt to the CPU that causes the CPU to execute a seek operation on the head to move the head to the second track between accessing the last short data sector of the first track and accessing the first short data sector of the second track.

14. The magnetic disk apparatus of claim 13, wherein the first and second data tracks are adjacent to each other.

15. The magnetic disk apparatus of claim 13, wherein
when the disk controller accesses short data sectors in the second track, the disk controller sequentially increments the second sector number each time a new short data sector is read, and
the first sector number, which the disk controller uses to access the new short data sector, is equal to the incremented second sector number or the incremented second sector number minus the number of short data sectors on the first track.

* * * * *